United States Patent Office 3,551,182
Patented Dec. 29, 1970

3,551,182
COATED POLYOLEFINS
Marco Wismer, Gibsonia, and Paul J. Prucnal, Monroeville, Pa., assignors to PPG Industries, Inc., a corporation of Pennsylvania
No Drawing. Continuation-in-part of application Ser. No. 473,146, July 19, 1965. This application Dec. 11, 1967, Ser. No. 689,251
Int. Cl. B44d 1/16
U.S. Cl. 117—45
7 Claims

ABSTRACT OF THE DISCLOSURE

This invention relates to coated thermoplastic polymer substrates and preferably to olefin high polymer substrates coated with an adherent coating of an interpolymer containing a substantial portion of a poly-unsaturated hydrocarbon and at least one monoolefin having a single copolymerizable ethylenic group, said interpolymers having been obtained by the polymerization in the presence of a transition metal catalyst and characterized by the fact that they contain sufficient remaining ethylenic unsaturation in the polymer molecule to permit substantial curing of the films thereof by oxidative mechanism.

CROSS-REFERENCES TO RELATED APPLICATIONS

This application is a continuation-in-part of U.S. application Ser. No. 473,146, filed July 19, 1965, now U.S. Pat. No. 3,484,355.

STATE OF THE PRIOR ART

Thermoplastic polymer packing materials, for example, over-wrap film containers of various shapes, such as molded bottles and the like, display many advantages, including attractive appearance, non-breakability, and low unit cost; however, while thermoplastic materials have found wide acceptance and utility in the packaging field, olefin high-polymer materials have exhibited certain drawbacks.

One of these drawbacks is that certain active materials which could otherwise be packaged in polyethylene or other polyolefins permeate the film. These include materials such as essential oils, liquid hydrocarbons, organic esters and ketones. Unattractive and often unsalable packages result from such permeation. Likewise, oxygen from the atmosphere can permeate the thermoplastic olefin high-polymer film and cause deterioration of oxygen-sensitive compositions such as edible oils and photographic compositions.

The coatings of the invention have excellent adhesion and serve as vapor-barrier coatings, as well as providing a base which is far more receptive to conventional printing inks than untreated polyolefin surfaces.

Another of the disadvantages of olefin high-polymer substrates is the low adhesiveness of such substrates to dried ink impressions, polymeric coatings, and the like. The result is that any information imprinted on the surface of polyethylene film, such as instructions, advertising trademarks or compositions, are rubbed off or peel or flake off by the normal abrasions suffered by the film during handling. Numerous treatments of the polyolefin film have been disclosed to remedy this situation. A number of these treatments are disclosed in U.S. Pats. Nos. 2,502,841; 2,648,097; 2,715,075; 2,715,076; 2,715,077 and 3,063,365.

The coatings of this invention are highly useful as ink bases and inks, and especially for polyolefins, particularly polyethylene which has not undergone special treatment to adapt it to take ordinary printing inks. The compositions of the invention, furthermore, have the advantage of being soluble in inexpensive solvents to produce finished inks which do not attack rubber rolls used in printing operations. Ink bases made in accordance with our invention can be provided in a desired color through additions of known types of dyes or pigments by conventional formulating techniques.

Another problem which is present in the use of olefin high polymer substrates is again related to the apparent lack of adhesion of the substrate for polymer coatings. It is often desirable to coat an olefin high-polymer film with a coating which improves the heat sealability of the film. Even olefin high-polymer films which have some degree of heat sealability are often coated to improve this sealability or to obtain heat sealability at a lower temperature. The adhesion level required for heat sealable coatings in order to achieve maximum effectiveness, that is, the degree of adhesion of the coating to the polyolefin, must be equal to or greater than the cohesive force of the coating itself when heat-sealed, is difficult to obtain. The usual treatments to make a polyolefin surface ink-receptive is usually not sufficient to improve the adhesson to the point where coatings upon heat sealing will not peel or lift free from the treated polyolefin surface.

Olefin high-polymers which are utilized as substrates are normally solid olefin polymers with sufficient molecular weight so that they may be fabricated into packages, fibers or films. The term "olefin high-polymers" as used in the present specification and claims denotes normally solid homopolymers of mono-ethylenically unsaturated monomers containing 2 to 10 carbon atoms inclusive and copolymers containing about 70 percent by weight, and preferably at least about 90 percent by weight of a monoolefinic unsaturated monomer containing 2 to 10 carbon atoms inclusive, with from about 30 percent by weight to about 10 percent by weight of at least one other olefinically unsaturated monomer copolymerizable therewith. Illustrative of the suitable homopolymers and copolymers which can be used as olefin high-polymer substrates for the coatings of this invention are homopolymers such as low density polyethylene, i.e., an essentially ethylene polymer having a density of from about 0.86 to about 0.94, and preferably high density polyethylene i.e., essentially linear polyethylene homopolymer having a density above about 0.94. Other homopolymers such as polypropylene, polybutene-1, poly (4-methylpentene-1), polyhexene-1, polyheptene-1, and the like, and copolymers such as for example ethylene-propylene copolymers, styrene-acrylonitrile polymer, ethylene-butene-1 copolymers, ethylene-ethylacrylate copolymers, ethylene-methyl methacrylate copolymers ethylene vinyl acetate copolymers, and the like. This, list however, is intended to be merely illustrative and should not be considered exhaustive of the olefin high-polymers which can be used in this invention.

THE COATING RESINS

The interpolymers of ethylenic hydrocarbons and poly-unsaturated compounds which form the coating compositions of this invention can be cured by an oxidative mechanism and can be employed in coating compositions applied by conventional means to provide cured coatings of highly desirable properties. Curable interpolymers of this type are disclosed in copending applications Ser. No. 413,326, filed Nov. 23, 1964, now U.S. Pat. No. 3,496,129; Ser. No. 460,544, filed June 1, 1965; and others. These interpolymers contain a substantial proportion of a poly-unsaturated hydrocarbon, preferably having non-conjugated ethylenic groups, interpolymerized with at least one monoolefin having a single copolymerizable ethylenic group, and are obtained by polymerization in the presence of a transition metal catalyst.

It has now been discovered that these interpolymers can be employed as adherent coatings, both continuous and discontinuous, on olefin polymer substrates, even virgin or untreated polyolefin substrates. These coatings may serve as printing inks, vapor barriers, or heat-sealable coatings.

In bonding with these interpolymers, their curing can be carried out entirely with atmospheric oxygen, or curing can be carried out with an added curing agent, if desired, to augment or replace the oxidative cure.

The non-rubbery, non-elastomeric interpolymers employed in the present invention are characterized by several properties which distinguish them from the rubbery polymers made from dienes and monoolefins. These include the following:

(1) The interpolymers employed herein contain a comparatively high degree of functional unsaturation, which permits them to be substantially cured by an oxidative mechanism. Substantial curing by oxidative mechanism means that a thin film, usually less than 10 mils, of the material upon exposure to air, cures sufficiently to become tack-free and essentially insoluble in aliphatic hydrocarbons, such as heptane. The interpolymers cure by auto-oxidation, absorbing oxygen from the air to build up a crosslinked structure. While curing may continue for days, or even weeks, sufficient curing to achieve a tack-free state takes place within a reasonable time, 24 hours at ordinary room temperature being usually taken as indicative.

The temperature of curing can vary. The preferred interpolymers substantially cure at ambient temperatures, and in any event below 100° F., but desirable materials can be produced which require somewhat higher curing temperatures, although in all cases the cure mechanism is predominantly oxidative. It is to be understood that the curing characteristics above serve to define the interpolymers herein but do not limit the possible methods of curing that can be used; for example, driers such as metal naphthanates can be employed to accelerate the cure, or a high oxygen atmosphere and higher temperatures than the minimum necessary can be used for the same purpose. Crosslinking agents can also be added, or cure can be induced by ultraviolet or other radiation, with or without the presence of photosensitizers, such as benzophenones.

The interpolymers utilized in accordance with this invention contain at least about 2 weight percent unsaturation, as defined below, and preferably contain 2.5 percent or more, with at least about 3 percent being desirable when oxidative curing is employed. They may have up to about 25 weight percent unsaturation, or even more.

(2) As indicated, the curing properties of these interpolymers differ from that of the rubbery polymers, and the extent of crosslinking thereby achieved is much higher. Whereas the rubbery polymers have a very low crosslink density, and require a vulcanizing agent to achieve that, films of the present interpolymers, contrastingly, dry in air without an added curing agent.

(3) The interpolymers herein are of lower molecular weight than are the rubbery polymers, as indicated by their lower intrinsic viscosity. Thus, the intrinsic viscosity of the known rubbery polymers is at least 1.0, and usually 1.5 or higher, corresponding to a molecular weight of 50,000 or more. This is considerably higher than the intrinsic viscosity of the present interpolymers, which preferably have an intrinsic viscosity no higher than about 0.9, and usually 0.6 or lower.

Intrinsic viscosity is described, for example, in the book by Allen entitled "Techniques of Polymer Characterization," Butterworth Publications, Ltd., London (1959); the values herein being measured in benzene at 25° C., using an Ubbelohde Dilution Viscometer.

(4) The present interpolymers are much more soluble in organic solvents than are the aforesaid rubbery polymers, permitting them to be dissolved in appreciable concentrations while maintaining a usable solution viscosity. For example, the preferred interpolymers have a Gardner-Holdt viscosity of Z or lower at 20 percent solids concentration in aromatic naphtha (e.g., Solvesso 100) or xylene, and can be applied from solvent-based compositions that have desirable application properties. There can be obtained solutions of the present interpolymers in benzene, xylene, aromatic naphtha or other solvents containing as much as 70 percent or more resin solids and having a utilizable viscosity, whereas solutions of the rubbery polymers containing only about 10 to 15 percent solids are usually completely unworkable.

Many of the properties of these interpolymers are attributable in large part to their structures, which includes an essentially saturated carbon chain as the polymer backbone, this chain containing a substantial proportion (i.e., 20 percent or more) of the total carbon atoms in the polymer molecule. Only a small amount of ethylenic unsaturation is in the polymer backbone, principally in terminal position, with at least a major part of the unsaturated linkages remaining in the polymer molecules being in pendent groups attached to the main polymer chain. The extent of unsaturation is sufficient to permit curing by oxidative mechanism, which in general requires at least about 2 percent by weight of unsaturation in the polymer. "Percent by weight of unsaturation," as employed herein, refers to the weight of groups of the structure

compared to the total weight of interpolymer. For instance, 2 percent by weight of unsaturation means each 100 grams of interpolymer contain 2 grams of carbon present in groups of the structure

Accurate determination of the extent of unsaturation in these products by common analytical techniques is quite difficult. For example, ordinary iodine value determinations have been found to be unreliable, and accurate analysis by chemical means in general required very tedious and time-consuming procedures. One method which can be used is infrared spectroscopic examination, in which the quantitative extent of unsaturation is determined by comparing the characteristic peak obtained from the interpolymer with that of a known material of similar structure and previously determined unsaturation level. Another method for determining the extent of unsaturation is by means of nuclear magnetic resonance spectroscopy, as described in the foregoing copending applications.

Because the reactivity of the interpolymers herein is such that small but significant amounts of unsaturation may be lost by oxidation or other reaction, handling and exposure of samples used for analysis should be minimized. Otherwise, low values may be obtained on analysis. For this reason, it is usually better to rely on the curing characteristics as indicative of the necessary exent of unsaturation, with numerical values being used chiefly for comparison of samples handled similarly.

The proportions of the components of the interpolymer can be varied widely, it being necessary only to interpolymerize sufficient polyunsaturated hydrocarbon with the monoolefin or monoolefins to provide the desired level of unsaturation in the polymer, this amount varying with the particular polyunsaturated compound. For instance, there should be interpolymerized along with the monoolefin or monoolefins at least about 11 percent of dicyclopentadiene or similar diene.

Among the polyunsaturated compounds that can be employed in producing the interpolymers described herein are various dienes and other polyenes. Dienes containing non-conjugated ethylenic groups, and to a lesser extent conjugated alicyclic dienes, are preferred. Included among the polyunsaturated compounds that can be employed are cyclic polyenes such as cycloalkadienes; substituted norbornenes, e.g., 5-alkenyl-2-norbornenes; norbornadiene(bicyclo[2.2.1]hepta - 2,5 - diene) and substituted norbornadienes, e.g., 2-alkyl norbornadienes; unsaturated terpenes, such as limonenes; and similar compounds. The polyene may contain substituents, such as halogen or oxygen-containing radicals, but in general it is preferred to employ unsubstituted hydrocarbons containing only carbon and hydrogen. Certain dienes exert a marked influence in lowering molecular weight, even when present only in very small amount. Norbornadiene and 4-vinylcyclohexane-1 have this effect and they are preferably included in the polyunsaturated hydrocarbon component when low molecular weight products are especially desired.

The preferred polyunsaturated compound utilized in the coating compositions of the instant invention is dicyclopentadiene. Other representative examples of specific polyunsaturated compounds which can be utilized are:

1,4-pentadiene
1,9-decadiene
3,3-dimethyl-1,5-hexadiene
1,4-hexadiene
1,9-octadecadiene
6-methyl-1,5-heptadiene
7-methyl-1,6-octadiene
11-ethyl-1,1-tridecadiene
1,3-cyclopentadiene
1,3-cyclooctadiene
5-methyl-1,3-cyclopentadiene
1-methyl-3-isopropyl-1,3-cyclopentadiene
Tricyclopentadiene
5-methyl-1,3-cyclopentadiene dimer
2-methyl-4-ethyl-1,3-cyclopentadiene dimer
1,4-cyclohexadiene
1,5-cyclooctadiene
1,5-cyclododecadiene
1,5,9-cyclododecatriene
1,4,6-cyclooctatriene
5-(2'-butenyl)-2-norbornene
5-(2'-ethyl-2'-butenyl)-2-norbornene
5-(1,5-propenyl)-2-norbornene
5-(2'-heptyl-1'-undecenyl)-2-norbornene
5-(2'-propyl-2'-pentenyl)-2-norbornene
5-methylene-2-norbornene
Bicyclo[2.2.1]hepta-2,5-diene
2-methyl norbornadiene
2-ethyl norbornadiene
2-isopropyl norbornadiene
2-heptyl norbornadiene
1,8(2)-menthadiene
Divinylbenzene
5-vinylbicyclo[2.2.1]hept-2-ene
Bicyclo[4.3.0]nona-3,7-diene.

Generally speaking, any monoolefin having a single copolymerizable ethylenic group can be interpolymerized with the polyene. Coatings satisfactory for many purposes can be made from interpolymers of the polyunsaturated compound with only a single monoolefin, e.g., copolymers of ethylene and dicyclopentadiene, or propylene and dicyclopentadiene. For other purposes, it is preferred to employ interpolymers of at least two comonomers with the polyunsaturated compound. In either event, it is preferred that ethylene comprise a substantial proportion of the interpolymer, i.e., at least about 20 percent by weight. Classes of preferred interpolymers include copolymers of a non-conjugated diene and ethylene, and interpolymers of a non-conjugated diene, ethylene, and at least one other monoolefin having a single terminal ethylenic group.

Of the large number of usable monoolefins, the preferred comonomers include those having the formula

where R is alkyl having, for example, up to about 20 carbon atoms, or aryl, and R' is hydrogen or alkyl of up to about 20 carbon atoms. Compounds of this class include propylene, 2-methylpropene, 2-propylhexene-1, 1-butene, 4-methyl-1-pentene, 1-pentene, 1-hexene, 1-octene, 5-methyl-1-nonene, 5,6,6-trimethyl-1-decene, 1-dodecene, and 1-tetradecene.

When two or more comonomers are utilized, their proportions are not critical since, as mentioned, copolymers of a single monoolefin with the polyunsaturated compound can be employed. The preferred proportions vary depending on the identity of the particular monomers. For example, interpolymers of ethylene, propylene, and a non-conjugated diene, usually dicyclopentadiene, generally contain from about 10 percent to about 40 percent of propylene, and from about 5 percent to about 50 percent of the diene, while preferred copolymers contain from about 20 percent to about 90 percent of ethylene and from about 10 percent to about 80 percent of a diene, such as dicyclopentadiene. It will be understood that the minimum usable amount of any diene depends to some extent upon its molecular weight. (The above percentages are by weight; the same is true of all parts and percentages throughout this specification unless otherwise specified.)

The interpolymerization of the foregoing monomers is carried out in the presence of a transition metal catalyst of the Ziegler type; examples of Ziegler catalysts (sometimes called Ziegler-Natta catalysts) are described in U.S. Pats. Nos. 3,153,023; 3,159,615; 3,168,504; and others. They generally involve interaction products of an alkyl aluminum compound and a transition metal compound. In making the interpolymers herein a preferred catalyst is composed of an organic vanadium compound and an alkyl aluminum halide, with the organic vanadium compound being usually vanadium tris(acetyl-acetonate) or vanadium oxybis(acetyl-acetonate). The alkyl aluminum halide cocatalyst is typically ethyl aluminum sesquichloride. Other catalyst systems can also be utilized.

In carrying out the interpolymerization, there is employed a liquid reaction medium, which can be an organic solvent or one of the reactants in liquid form. Purified benzene, xylene, toluene, chlorobenzene, or a similar aromatic solvent is generally utilized, although other solvents can be employed. For efficient operation, care should be taken to exclude oxygen and moisture. The temperature is maintained at room temperature of preferably below, e.g., 20° C. or lower, with temperatures as low as −80° C. or lower being advantageously utilized. The catalyst and reactants can all be added initially, or one or more can be added continuously or incrementally. Gaseous reactants are generally fed to the reaction vessel as the polymerization progresses, maintaining saturation of the mixture.

Atmospheric pressure can be utilized in carrying out the interpolymerization reaction, as can elevated pressures up to 1000 atmospheres or more. At the end of the polymerization, residual catalyst can be removed if desired by washing the reaction mixture with water or acid. If desired, part of the solvent can be distilled off along with unreacted polyene or other reactants, and these can be recovered or recycled. These polymers are more fully described in application Ser. No. 413,326, filed Nov. 23, 1964, now U.S. Pat. No. 3,496,129, which is incorporated herein by reference including the examples thereof. Examples of these polymers include:

EXAMPLE A

A clean, dry reaction vessel was flushed with nitrogen gas and charged with 10 liters of dried benzene. Ethylene and propylene were passed into the solvent at a rate of 6.0 liters and 12.0 liters per minute, respectively, and there were added 176 milliliters of dicyclopentadiene, 50.4 milliliters of bicyclo[2.2.1]hepta-2,5-diene, and 20.0 milliliters of a 1.5 molar solution of ethyl aluminum sesquichloride in benzene. While maintaining the temperature at about 5° C., 50 milliliters of a 0.02 molar solution of vanadium oxybis(acetylacetonate) in benzene were introduced. The off-gas rate dropped and the ethylene and propylene rates were increased to 10 and 20 liters per minute for 1 minute, during which the off-gas rate again rose. After 5 minutes, there were then added 5 milliliters of bicycloheptadiene, 17.6 milliliters of dicyclopentadiene, and 50 milliliters of the vanadium oxybis (acetylacetonate) solution. When absorption decreased, the above additions were again made, and this was repeated for a total of 6 additions. The polymerization was carried out for a total of 44 minutes from the time of the first vanadium catalyst addition. Methanol was added to the reaction mixture and it was washed with aqueous HCl, and then washed acid free with distilled water. The benzene was stripped at reduced pressure and replaced with about 2 liters of Enjay 100 (aromatic naphtha, boiling range 150–170° C.) and stripping continued until the solution had a solids content of about 35.4 percent and a Gardner-Holdt viscosity of Z–2. Infrared analysis of the product showed the absence of free dicyclopentadiene and indicated that the approximate polymer composition was about 50 percent ethylene, about 20 percent propylene and about 30 percent dicyclopentadiene, all in polymerized form. The intrinsic viscosity of the interpolymer was 0.30 deciliter/gram.

EXAMPLE B

A thoroughly clean and dry reaction vessel and fittings were flamed and cooled under a stream of nitrogen. The vessel was then charged with 3 liters of dried benzene and sparged with nitrogen for 15 minutes. While passing ethylene and propylene at the rate of 6 liters per minute each into the solution, there were added 52.8 milliliters of dicyclopentadiene, the mixture was cooled to 5° C., and 6.0 milliliters of a 1.0 molar solution of ethyl aluminum sesquichloride in benzene were then added. Cooling was maintained throughout the polymerization, which was initiated by the addition of 15.0 milliliters of a 0.02 molar solution of vanadium oxybis(acetylacetonate) in benzene. The concentration of the vanadium compound was about 0.1 millimoles per liter and the concentration of the ethyl aluminum sesquichloride was 2.0 millimoles per liter. Polymerization began immediately, as evidenced by the rise in the temperature to 8° C. and complete absorption of all gases passing into the solution, i.e., no off-gas could be observed. After about 1 minute, off-gas began to be observed once more; reaction conditions were maintained for 6 minutes after the addition of the vanadium compound, during which time the temperature dropped slowly to 5° C.

There were then added 20 milliliters of methanol and the reaction mixture was divided into equal portions; each portion was washed with 5 milliliters per liter of concentrated HCl and then washed with 50 milliliter increments of distilled water until acid-free. The portions were recombined and benzene was removed by evaporation at reduced pressure at room temperature or below. When most of the benzene had been removed, about 2 liters of aromatic naphtha (Solvesso 100, boiling range 150° C. to 170° C.) were added and stripping was continued until about three-quarters of the Solvesso 100 had been removed, thus also removing the residual dicyclopentadiene and benzene. The solution obtained had a solids content of 11.5 percent and a Gardner-Holdt viscosity of L.

EXAMPLE C

A thoroughly clean and dry reaction vessel was flushed with nitrogen gas, charged with 2.5 liters of benzene, and sparged with nitrogen for 15 minutes. Ethylene and propylene were passed into the solvent at a rate of 2.0 liters and 4.0 liters per minute, respectively, and this was maintained throughout the polymerization. There was then added 25 milliliters of dicyclopentadiene and, after cooling to 7° C., 7.5 milliliters of a 1.0 molar solution of ethyl aluminum sesquichloride in benzene were added. While maintaining the temperature between 7° C. and 11° C., 25 milliliters of a 0.01 molar solution of vanadium oxybis(acetylacetonate) in benzene were introduced, whereupon off-gas rate dropped to zero, then rose in 2 minutes to 360 liters per hour, indicating that absorption had ceased. Another 26 milliliter portion of the vanadium oxybis(acetylacetonate) solution was added, whereupon again all the gas added was absorbed for a short time and then absorption ceased. The catalyst addition was again repeated, and after absorption ceased once more, 25 milliliters of dicyclopentadiene were added, along with another catalyst portion as above. Three more additions of the vanadium catalyst were made, in each case after absorption had ceased.

The polymeriztion was carried out for a total of 40 minutes from the time of the first vanadium catalyst addition, and was terminated by the addition of 10 milliliters of methanol. The reaction mixture was then washed with 30 milliliters of concentrated HCl, and then washed acid-free with 15 one-liter portions of distilled water. The benzene was stripped at reduced pressure, as in Example I, and replaced with about 1.5 liters of mineral spirits, and stripping continued until most of the mineral spirits had been removed. There was obtained 247 grams of solution containing 78.8 grams of interpolymer (solids content of 31.0 percent). Infrared analysis of the product showed the absence of free dicyclopentadiene and indicated that the approximate polymer composition was 40 percent ethylene, 24 percent propylene, and 36 percent dicyclopentadiene, all in polymerized form.

EXAMPLE D

A clean, dried reaction vessel was flushed with nitrogen, charged with 3.0 liters of aromatic naphtha (Solvesso 100) and sparged with nitrogen for 15 minutes. Ethylene and propylene were then passed into the solvent at a rate of 2.0 liters per minute each. There were added 8.4 milliliters of a 1 molar solution of ethyl aluminum sesquichloride in benzene, and the mixture was cooled to 7° C. The rate of ethylene and propylene was decreased to 1.0 liter per minute each and 20 milliliters of dicyclopentadiene were added. There were then added 20 milliliters of a 0.01 molar solution of vanadium tris(acetylacetonate) in benzene. After 2 minutes, the rate of ethylene and propylene addition was again increased to 2.0 liters per minute each and continuous addition of 2.0 milliliters per minute of the vanadium compound solution and 1.0 milliliters per minute of dicyclopentadiene was begun.

The temperature rose to 12° C. and then slowly fell to 7 to 9° C. during the remainder of the polymerization. after 9 minutes from the initial vanadium catalyst addition, the rate of addition of the vanadium catalyst solution was increased to 4.0 milliliters per minute and the addition of dicyclopentadiene was increased to 2.0 milliliters per minute. After 6 more minutes, the rate of ethylene and propylene addition was decreased to 1.0 liter per minute each. After 32 more minutes, the addition of dicyclopentadiene was ended, and after another 11 minutes the addition of the vanadium compound was complete. Ethylene and propylene were passed into the mixture for another 20 minutes, and then 10 milliliters of methanol were added. A total of 210 milliliters of the vanadium compound solution and 90 milliliters of dicyclopentadiene had been added.

The clear product solution was washed 3 times with 5 percent aqueous HCl, then washed with distilled water until acid-free. The solution was then concentrated at 12 to 20 millimeters of mercury pressure and 35 to 45° C. There was obtained a solution having a solids content of 9.5 percent and containing a total of 66.9 grams of interpolymer.

EXAMPLE E

Following the procedure of Example B, an interpolymer was produced from ethylene, propylene and 5-methylene-2-norbornene, using 2.5 liters of benzene, 13.3 grams of 5-methylene-2-norbornene, 3.6 milliliters of a 1.4 molar solution of ethyl aluminum sesquichloride in toluene, and 12.5 milliliters of a 0.02 molar solution of vanadium oxybis(acetylacetonate) in benzene. The ethylene and propylene were added at a rate of 6.0 liters per minute each. After the polymer solution had been washed with acid and water, benzene was removed and Solvesso 100 was added and partially distilled at 25° C. and reduced pressure. There was obtained 689 grams of a solution containing 41.4 grams of interpolymer.

EXAMPLE F

A clean, dry reaction vessel was flame-dried and flushed with nitrogen. One liter of purified, dry benzene was charged and sparked with nitrogen for 10 minutes. 20.4 cc. of dicyclopentadiene and 1.1 cc. of a 1.2 molar solution of ethyl aluminum sesquichloride in toluene were added. The mixture was brought to a temperature of 20° C. The nitrogen sparge was discontinued and ethylene introduced into the reactor until the reactor and contents were saturated with ethylene at 20° C. Excess ethylene was then vented to the atmosphere. The ethylene feed was discontinued and with the effluent valve closed, hydrogen was introduced to correct the partial pressure to 40 p.s.i.g. Ethylene was then introduced to bring the pressure to 50 p.s.i.g. (80 volume percent $H_2$ charged) and the ethylene feed allowed to remain open to the reactor at 50 p.s.i.g. 2 cc. of 0.05 molar solution of vanadium tris(acetyl acetonate) in benzene was injected into the reactor at 20° C., whereupon the temperature rise occurred and an uptake of ethylene was noted. The exotherm was controlled by cooling. After about 5 minutes, no further evidence of reaction was noted in the polymerization mixture.

The polymerization mixture was then removed from the reactor and a small amount of methanol added to quench the catalyst.

The mixture was then worked up as follows: washed twice with 5 cc./liter aqueous HCl; then washed with liter portions of deionized water until neutral. Benzene and emulsified water were removed at reduced pressure until a noticeable increase in viscosity occurred, at which time 1000 cc. of aromatic naphtha, boiling range 150–170° C., were added. The excess solvent is stripped at reduced pressure until the desired viscosity and/or solids content is reached (unreacted dienes co-distill with the naphtha):

Percent solids—25.7
Gardner-Holdt viscosity—A—
Ash content—0.029 percent
Iodine number—57.6
Wt. percent D.C.P.D. (NMR)—40.3
Intrinsic viscosity—0.158 dl./g. (benzenes 25° C.).

EXAMPLE G

A clean, dry reaction vessel was flame-dried and flushed with nitrogen. One liter of purified, dry benzene was charged and sparged with nitrogen for 10 minutes. 20.4 cc. (.15 millimol) of dicyclopentadiene and 1.2 cc. of a 1.2 molar solution of ethyl aluminum sesquichloride in toluene were added and the mixture brought to a temperature of 20° C. The nitrogen sparge was discontinued and the solution saturated with propylene ($C_3$), the excess being vented to the atmosphere. Hydrogen was then added to bring the pressure to 40 p.s.i.g. A mixture of propylene ($C_3$) and ethylene ($C_2$), ($C_3/C_2$–1.5 volume ratio) to 50 p.s.i.g. and this feed was maintained with a backpressure of 50 p.s.i.g. 0.1 millimol of vanadium tris(acetylacetonate) was injected into the reactor at 20° C., whereupon an exotherm was noted, along with a feed mixture uptake and exotherm, which was controlled by cooling back to 20° C. After no further evidence of reaction was noted, the reaction mixture was removed from the reactor and a small amount of methanol added to deactivate the catalyst.

The mixture was worked up as follows: The mixture was washed twice in 20 cc. HCl/liter aqueous HCl. The polymer was then precipitated in methanol and redissolved in aromatic naphtha, boiling range 150–170° C., and brought to the desired viscosity by stripping at reduced pressure.

Percent solids—48.7
Gardner-Holdt viscosity—X-Y
Ash content—820 p.p.m.
Iodine number—38.9
Acid value—0.0
Intrinsic viscosity—0.21 dl./g. (benzene 25° C.)
NMR analysis:
    DCPD—36.4 percent
    $C_3$—29.1 percent
    $C_2$—34.6 percent While the use of the above-described interpolymers are generally preferred, properties of the aforesaid interpolymers may be modified by reacting the interpolymer with a controlled amount of oxygen or oxidizing agent, so as to effect partial oxidation of the interpolymer. The partial oxidation provides such properties as better compatibility with other co-reactive materials, improved pigment wetting, better adhesion to many substrates, and other desirable characteristics. In many cases, curing times are shorter with the oxidized polymers, providing harder films in relatively short times at room temperature. These interpolymers may also be employed as film formers in the instant invention.

The oxidation of the above interpolymers can be carried out in several ways. For instance, air, oxygen, ozone or the like, can be passed through the interpolymer or a solution of the interpolymer, or an oxygen-releasing agent can be added, or oxygen-containing functional groups can be introduced by reaction of the interpolymer with a material which provides oxidation of the double bonds. Such reactive materials include, for example, peroxides such as benzoyl peroxide and hydrogen peroxide, perbenzoic acid, potassium permanganate, peracetic acid, and the like.

The preferred method is passing oxygen or an oxygen-containing gas through a solution of the interpolymer. This is generally carried out at moderately elevated temperatures, e.g., 50° C. to 150° C., since the oxidation is relatively slow at room temperature. Atmospheric pressure is usually employed because of convenience, although elevated pressures are also useful. Driers, such as metal salts of fatty acids, e.g., the naphthenates, linoleates and resinates of cobalt, lead and similar metals, or other oxidation catalysts, can also be included if desired.

The amount of oxygen incorporated in the partially oxidized interpolymers herein can be varied, but usually at least about 0.5 percent by weight of added combined oxygen should be introduced into the polymer molecule, i.e., at least about 0.5 percent by weight of oxygen should be introduced as a result of the oxidation reaction as described therein. The exact mechanism of the reaction and the precise nature of the oxidized product are not known. It is believed that oxygen reacts with the double bonds in the interpolymer; from infrared spectrographic examination it is known that at least part of the combined oxygen results in hydroxyl, carboxyl, ether, and other oxygenated groups attached to carbon atoms in the polymer.

The product after the oxidation reaction should be curable, that is, crosslinkable to a hard state, but at the same time retain the viscosity and other characteristics suitable for its intended use, for example, as a coating composition. Thus, the amount of oxidation should not be sufficient to excessively crosslink the interpolymer prematurely. In general, the extent of oxidation should be controlled so as to provide a product which remains soluble in organic solvents, such as ketones, alcohols, aromatic hydrocarbons, aliphatic hydrocarbons, and the like. If, as is usually the case, the oxidation reaction is carried out in organic solvent solution, insolubilization of the interpolymer is easily observed and avoided. While it is only necessary to avoid excess crosslinking as discussed above, in most cases the amount of added combined oxygen does not exceed about 10 percent by weight of the total polymer.

If an excessive amount of oxidation and crosslinking occurs, as evidenced by incipient gel formation, it can be reversed by addition of a trace or a small amount of alcohol, such as ethanol, isopropanol, or other lower alkanol. This affords considerable latitude in carrying out the oxidation process.

As indicated above, the oxidation reaction is preferably carried out using an organic solvent solution of the interpolymer. Essentially any solvent can be employed for this purpose so long as the solvent does not itself unduly oxidize or otherwise interfere with the desired reaction. Aliphatic hydrocarbons, such as pentane, hexane, heptane, and the like; aromatic hydrocarbons, such as benzene, toluene, and similar compounds; and alkylated aromatic hydrocarbon solvents, such as aromatic naphtha, are effectively utilized in this manner, although other solvents, such as ketones, esters and alcohols, can also be employed. Mixtures of the aforesaid solvents, such as are found in aliphatic and aromatic naphthas commercially available, can also be used.

In the coating compositions exemplified above, the interpolymers of the invention provide the essential or sole film-forming component. However, useful coating compositions are also achieved by combining the interpolymers herein with other resinous materials, including not only plasticizers and other non-co-reactive products, but also various substances which co-react with the interpolymer during curing or before, as while formulating or even during polymerization. Advantages of the use of co-reactive materials with the interpolymers include the attainment of specific properties of the cured coatings, modification of solution properties, and similar objectives.

Among the compositions containing co-reactive materials along with the interpolymers are those described in copending application Ser. No. 413,327, now U.S. Pat. No. 3,442,839. In these compositions, the interpolymers of the present invention are combined with an unsaturated glyceride oil.

Other co-reactive materials which can be combined with these interpolymers include various polymers containing olefinic unsaturation or other functional groups or sites, which can react with the interpolymer or with oxidation products of the interpolymer during curing. These include, for example, oil-modified alkyd resins, such as drying or semi-drying oil-modified glycerol phthalate resins; glyceride oils or oil-modified alkyd resins reacted with cyclopentadiene or a polymer thereof, such as those described in U.S. Pats. Nos. 2,399,179 and 2,404,836; epoxidized butadiene polymers, such as those known as Oxiron resins; polymers or copolymers of unsaturated aldehydes such as acrolein, polymerized through the aldehyde groups leaving residual unsaturation; maleates, optionally in the presence of reactive solvents such as styrene; hydrocarbon resins containing ethylenic unsaturation, such as polymerized petroleum fractions, including residues known as distillate bottoms; reaction products of drying and semi-drying oils and unsaturated dicarboxylic acids or anhydrides, such as the so-called maleinized oils, e.g., the adduct of maleic anhydride and linseed or soya oil; reactive solvents, such as styrene, vinyl toluene, or other vinyl aromatic hydrocarbons, or acrylates or methacrylates, e.g., methyl methacrylate; resins containing free —SH groups, such as those produced by reacting dichlorodiethylformal and alkali polysulfide (Thiokol resins); epoxy resins, such as the reaction products of Bisphenol A and epichlorohydrin, epoxidized alicyclic compounds, and other polyepoxides and monoepoxides; interpolymers of unsaturated carboxylic acid amides and other ethylenic monomers, which may be aldehyde-modified and etherified, for example, those disclosed in U.S. Pat. No. 2,978,437 and U.S. Pat. No. 3,037,963; aminoplast resins, such as melamine-formaldehyde and urea-formaldehyde condensation products; and others of similar chemical structure and reactivity.

The invention will be further described in conjunction with several examples demonstrating various embodiments thereof. All parts and percentages in the examples, as well as throughout this specification, are by weight unless otherwise specified.

EXAMPLE I

A printing ink was formulated as follows:
The following were charged into a small ball mill (glass balls) and ground to a 6½ Hegman fineness:

| | Parts by weight |
|---|---|
| Lithium red | 72.0 |
| $TiO_2$ | 8.0 |
| Resin of Example A (51.3% solids) | 31.2 |
| Toluene | 80.0 |

The paste was then let down with 324 parts of the resin of Example A (51.3% solids).

EXAMPLE II

The coatings of this invention were compared with several commercial printing inks recommended for treated polyolefins. Low density polyethylene sheet was silk screen printed with each of the following inks and adhesion compared:

A.—SS FDE–301 (alkyd based)
B.—SS Special Poly (alkyd based)
C.—Ink of Example I.

ROOM TEMPERATURE CURE

| Ink: | Tack-free time | Scotch tape test after 20 hours |
|---|---|---|
| A | 2–3 minutes | Poor. |
| B | 3 minutes | Poor. |
| C | 1 minute | Fair. |

Cured 5 minutes at 185° F.

| Ink: | Scotch tape test after cure |
|---|---|
| A | Poor |
| B | Poor |
| C | Good |

Poor.—Denotes substantial loss of adhesion with little or no coating remaining on the substrate.
Fair.—Denotes noticeable loss of adhesion but with at least the majority of the film remaining.
Good.—Denotes no substantial loss of adhesion, only small area lifted at most.

EXAMPLE III

The ink Example I was silk screen applied to both low density polyethylene bottles and polypropylene bottles. After a cure of 10 minutes at 210° F. or 5 minutes at 250° F., good adhesion was obtained, as judged by the Scotch tape test. Likewise, air-dried films after 6 days showed no loss of adhesion in a similar test.

EXAMPLE IV

To demonstrate the effectiveness of the coatings of the instant invention as vapor barrier coatings, polyethylene film was coated using a No. 022 wire drawbar with a polymer comprising 60.1 percent ethylene and 39.9 percent dicyclopentadiene prepared in the presence of ethyl aluminum sesquichloride and vanadium tris(acetylacetonate) having an intrinsic viscosity of 0.28; 52 percent solids in aromatic naphtha, boiling range 150–170° C., with a Gardner-Holdt viscosity of Z–8 to Z–9.

Oxygen permeation was determined using a cell, as described in ASTM D–1434–63.

Control (uncoated).—3600 cc. at STP/sq. meter/atmosphere/24 hours.

Coated as above.—970 cc. at STP/sq. meter/atmosphere/24 hours.

EXAMPLE V

This example demonstrates the use of the interpolymers herein described as a primer to render polyolefin more receptive to conventional printing inks.

One-half of a 4″ x 6″ low-density polyethylene sheet was masked and the second half sprayed with a thin film of interpolymer (40 percent ethylene, 33.3 percent propylene, 26.7 percent DCPD—intrinsic viscosity 0.2). The dry film thickness was below 0.1 mil. The film was baked at 180° F. for 30 seconds. The panel was rotated 180° and one half alternately masked perpendicular to the first line. Each half was then sprayed with a commerical printing ink to a thickness of .5 mil, thus creating a panel having a direct comparison between the ink on the primed and unprimed surfaces. The following results were obtained:

Quadrant A.—Primer and Ink A—SS FOE 301, Bright Red (alkyd based)
Quadrant B.—Primer and Ink B—SS Special Poly 301, Bright Red A–49214 (alkyd based)
Quadrant C.—Ink A (primerless)
Quadrant D.—Ink B (primerless)

| Quadrant: | Scotch tape test | Flex test |
| --- | --- | --- |
| A | Coating thinned by taping, no loss of adhesion. | Cracking, but no flaking off. |
| B | No delamination | Do. |
| C | Delamination | Cracking and flaking off panel. |
| D | do | Do. |

According to the provisions of the patent statutes, there are described herein the invention and what are now considered to be its best embodiments. However, it is to be understood that, within the scope of the appended claims, the invention can be practiced otherwise than as specifically described.

We claim:
1. An olefin high polymer substrate having an adherent coating comprising a non-rubbery interpolymer of a cyclic polyene monomer selected from the group consisting of 1,3-cyclopentadiene, 5-methyl-1,3-cyclopentadiene, dicyclopentadiene, tricyclopentadiene, and 5-methyl-1,3-cyclopentadiene dimer and at least one monoolefin monomer having a single copolymerizable ethylenic group, said interpolymer having an essentially saturated carbon chain containing a substantial proportion of the total carbon atoms in the polymer molecule, said interpolymer having an intrinsic viscosity of no higher than 0.6 deciliter/gram and containing at least about 2.5 percent by weight of ethylenically unsaturated groups in the polymer molecule.

2. The article of claim 1 comprising a container comprising a polyolefin structure having a continuous vapor barrier coating of an interpolymer comprising a non-rubbery interpolymer of a cyclic polyene monomer selected from the group consisting of 1,3-cyclopentadiene, 5-methyl - 1,3 - cyclopentadiene, dicyclopentadiene, tricyclopentadiene, and 5-methyl-1,3-cyclopentadiene dimer and at least one monoolefin monomer having a single copolymerizable ethylenic group, said interpolymer having an essentially saturated carbon chain containing a substantial proportion of the total carbon atoms in the polymer molecule, said interpolymer having an intrinsic viscosity of no higher than 0.6 deciliter/gram and containing at least about 2.5 percent by weight of ethylenically unsaturated groups in the polymer molecule.

3. The article of claim 1 wherein the interpolymer comprises dicyclopentadiene, ethylene and propylene.

4. The article of claim 1 wherein the interpolymer coating is at least partially coated with a printing ink.

5. The article of claim 1 in which said cyclic monomer is dicyclopentadiene.

6. The article of claim 1 in which said monoolefin comprises ethylene.

7. The article of claim 6 in which said monoolefin comprises a mixture of ethylene and propylene.

References Cited

UNITED STATES PATENTS

| 2,860,801 | 11/1958 | Nielsen | 117—94X |
| 3,208,982 | 9/1965 | Davis | 117—161(UIT)X |
| 3,262,482 | 7/1966 | Clifton et al. | 117—161(UIT)X |
| 3,318,721 | 5/1967 | Lineburg | 117—161(UIT)X |
| 3,330,794 | 7/1967 | Gallagher | 117—161(UID)UX |
| 3,405,754 | 10/1968 | Georges et al. | 117—161(UIT)UX |

ALFRED L. LEAVITT, Primary Examiner

C. K. WEIFFENBACH, Assistant Examiner

U.S. Cl. X.R.

117—12, 94, 138.8, 161; 260—80.7